United States Patent
Ayanamcottil et al.

(10) Patent No.: US 8,244,210 B2
(45) Date of Patent: Aug. 14, 2012

(54) METHOD FOR DESTRUCTIVE READOUT OF DATA IN CASE OF MOBILE THEFT

(75) Inventors: Antony Aloysius Ayanamcottil, Bangalore (IN); Varun Yarehalli Chandrappa, Bangalore (IN); Natesh Shridhar Revankar, Bangalore (IN); Priya Verma, Bangalore (IN); Mohammad Dilshad Alam, Bangalore (IN); Nitin Prakash Sharma, Bangalore (IN); Praveen Prakash Thazhalhu Pullaikudi, Bangalore (IN)

(73) Assignee: Samsung Electronics Co., Ltd (KR)

( * ) Notice: Subject to any disclaimer, the term of this patent is extended or adjusted under 35 U.S.C. 154(b) by 587 days.

(21) Appl. No.: 12/325,622

(22) Filed: Dec. 1, 2008

(65) Prior Publication Data

US 2009/0143048 A1    Jun. 4, 2009

(30) Foreign Application Priority Data

Nov. 29, 2007   (IN) .......................... 2802/CHE/2007

(51) Int. Cl.
*H04M 1/66* (2006.01)
(52) U.S. Cl. ......... 455/411; 455/410; 455/419; 455/420
(58) Field of Classification Search .................. 455/410, 455/411, 418–420, 466, 414.1, 404.1
See application file for complete search history.

(56) References Cited

U.S. PATENT DOCUMENTS

| 6,381,477 | B1 * | 4/2002 | Johnson et al. | 455/572 |
|---|---|---|---|---|
| 6,687,901 | B1 * | 2/2004 | Imamatsu | 717/173 |
| 6,741,851 | B1 | 5/2004 | Lee et al. | |
| 2005/0185438 | A1 * | 8/2005 | Ching | 365/52 |
| 2006/0234679 | A1 | 10/2006 | Matsumoto et al. | |
| 2006/0281450 | A1 * | 12/2006 | Cocita | 455/418 |
| 2006/0293029 | A1 * | 12/2006 | Jha et al. | 455/411 |
| 2007/0178881 | A1 | 8/2007 | Teunissen et al. | |
| 2007/0281664 | A1 * | 12/2007 | Kaneko et al. | 455/410 |
| 2008/0209965 | A1 * | 9/2008 | Maack | 70/262 |
| 2008/0220744 | A1 * | 9/2008 | Rydgren et al. | 455/411 |

FOREIGN PATENT DOCUMENTS

| CN | 1781326 | 5/2006 |
|---|---|---|
| EP | 1 473 952 | 11/2004 |
| KR | 10-2005-0071871 | 7/2005 |
| KR | 10-2005-0122672 | 12/2005 |
| KR | 10-2006-0095316 | 8/2006 |
| KR | 10-2007-0060657 | 6/2007 |

* cited by examiner

*Primary Examiner* — Rafael Pérez-Gutiérrez
*Assistant Examiner* — Keith Fang
(74) *Attorney, Agent, or Firm* — The Farrell Law Firm, P.C.

(57) ABSTRACT

A method for destructively reading out data from a stolen or lost mobile phone. A special switch off feature disables all the services associated with the mobile phone, except for a messaging service and the ability to destructively read out data. A user can retrieve the data stored in the mobile phone from a remote location. Once the data is retrieved, all the data in the mobile phone is erased.

19 Claims, 7 Drawing Sheets

METHOD FOR DESTRUCTIVE READOUT OF DATA IN CASE OF MOBILE THEFT

PRIORITY

This application claims priority to an application entitled "A Method for Destructive Readout of Data in Case of Mobile Theft", which was filed in the Indian Patent Office on Nov. 29, 2007 and assigned Serial No. 2802/CHE/2007, the content of which is hereby incorporated by reference.

BACKGROUND OF THE INVENTION

1. Field of the Invention

The present invention relates generally to mobile communication, and more particularly, to a method for providing data security in a mobile phone in case the mobile phone is stolen or lost by providing destructive readout of data.

2. Description of the Related Art

When a mobile phone is stolen or lost, there is a high probability that the person who has stolen or finds the mobile phone may switch the mobile phone off in order to preempt the possibility of tracking the mobile phone. Also, it is a concern that important and/or private user information such as contact numbers, contact addresses, messages, images, etc., in the mobile phone may be misused by an unscrupulous person.

A U.S. Patent Publication entitled, "Information Protection System for Mobile Terminal Device, Information Protection Method for Mobile Terminal Device, Control Program, Computer-Readable Medium and Electronic Information Device" (U.S. 2006/0234679), proposes a method and system for protecting information in a mobile terminal device, e.g., a mobile telephone, in the event of it being stolen or lost. According to this publication, the owner of the mobile terminal device, after clearing the personal authentication process by prompting personal identity information in the Information protection system, can perform various information protection processes such as stopping the original functions of the mobile device, prohibiting output of data from the mobile device, and blocking, deleting, or retrieving data from the mobile device in order to safeguard the stored contents.

Another U.S. Patent Publication entitled, "Remotely Controlling Access to Subscriber Data Over a Wireless Network for a Mobile Device" (U.S. 2007/0178881), proposes a method and system for remotely accessing subscriber data associated with a stolen or lost mobile device by using messaging function. As per this publication, a user transmits a message, e.g., a Short Messaging Service (SMS) to the mobile device to prohibit access to the data contained in the mobile device. The message sent by the owner may contain an instruction for the lost or stolen mobile device to irrecoverably delete the data contained in the memory, merely make the data inaccessible to an unintended recipient, or recover a portion of the data, before blocking connectivity over the network.

However, none of the above-mentioned publications provide a "Special Switch Off" feature by the user before loss/theft of the mobile phone and enabling a "Mechanical Latch" to lock a Subscriber Identity Module (SIM) in place.

Based upon the foregoing, there is a need for a system and method, which overcomes these problems.

SUMMARY OF THE INVENTION

The present invention has been designed to address at least the above problems and/or disadvantages and to provide at least the advantages described below. Accordingly, an aspect of the present application provides a method for providing data security in a mobile phone, in case the mobile phone is stolen or lost, by retrieving the data on another entity, and then deleting the data on the mobile phone.

Another aspect of the invention to provide a method for data security in a mobile phone in case the mobile is stolen or lost.

It is another aspect of the invention to provide a method for remotely deleting the private data in the stolen mobile.

It is another aspect of the invention to provide a method by which a mobile phone could be switched off.

It is a further aspect of the invention to provide a method for locking the SIM card using a mechanical latch.

It is another aspect of the invention to provide a method of retrieving private data in a stolen mobile phone into a service provider provided inbox.

It is yet another aspect of the invention to provide a method of retrieving private data from a stolen mobile phone to another mobile phone by sending an SMS.

In accordance with an aspect of the present invention, a method of retrieving data in a mobile phone is provided. The method includes retrieving the data, on receipt of a message for retrieving the data from other mobile phone or service provider; and deleting the data stored in the mobile phone, if the retrieving of the data is completed.

In accordance with another aspect of the present invention, a method is provided for protecting and retrieving information in a mobile phone, when the mobile phone is stolen or lost. The method includes enabling a special switch off feature of the mobile phone; receiving a message in the mobile phone; retrieving data from the mobile phone, in response to the message; and deleting the retrieved data from the mobile phone. The special switch off feature powers off the mobile phone, except for an ability to perform the receiving, the retrieving, and the deleting.

BRIEF DESCRIPTION OF THE DRAWINGS

The above and other aspects, features, and advantages of the present invention will become more apparent from the following detailed description when taken in conjunction with the accompanying drawings in which.

DETAILED DESCRIPTION OF PREFERRED EMBODIMENTS

Preferred embodiments of the present invention are described below in detail with reference to the accompanying drawings. However, the disclosed embodiments are merely exemplary of the invention, which may be embodied in various forms. Therefore the details disclosed herein are not to be interpreted as limiting but merely as the basis for the claims and as a basis for teaching one skilled in the art on how to make or use the invention.

According to the present invention, the method of destructive read out of data in case of mobile theft will incorporate the following steps:

a) "Special switch off" for a mobile phone;

b) Locking a SIM card of the mobile phone using a mechanical latch; and c) Sending a message to the lost/stolen mobile phone from a preconfigured mobile number or service provider, and retrieving the data, while destructively reading out the data.

Figure 1:
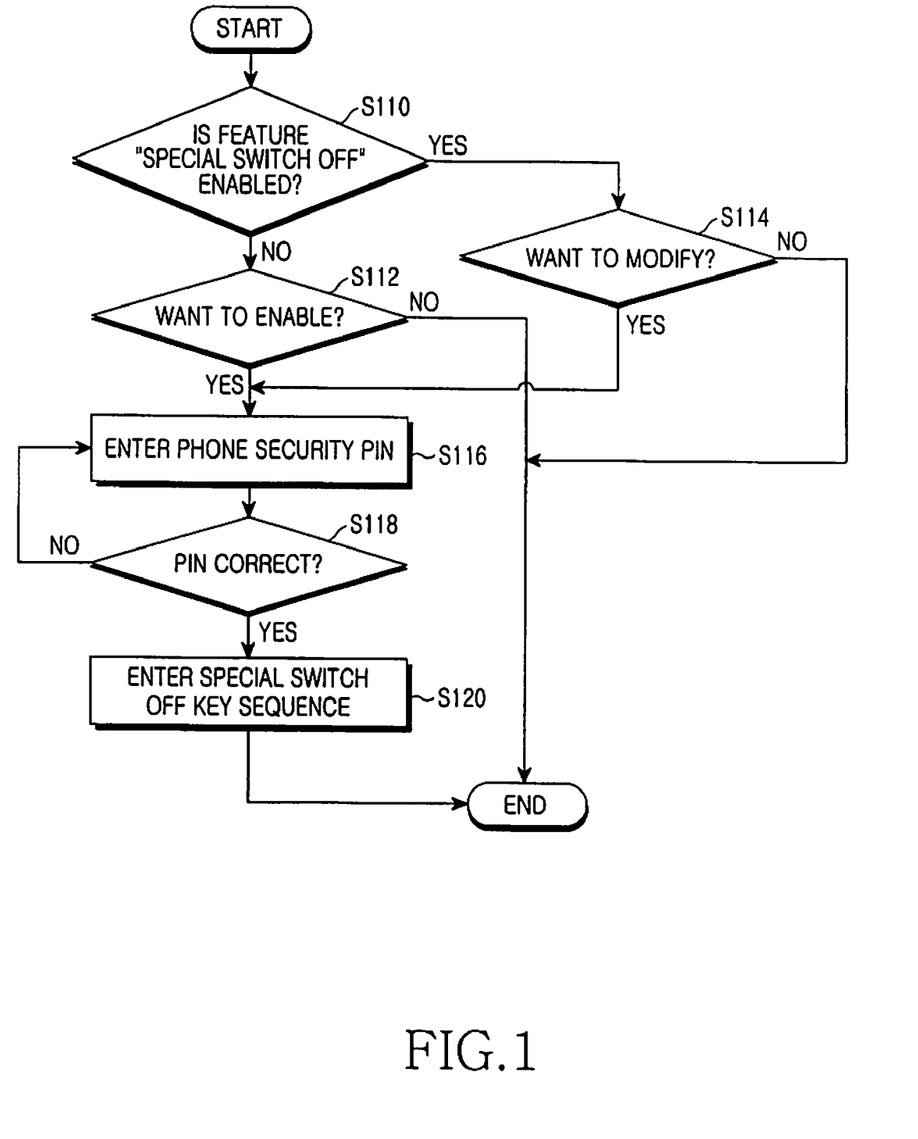
FIG. 1 is a flowchart illustrating a method for enabling/disabling and modifying special switch off feature.

FIG. 1 is the flowchart illustrating a method for enabling/disabling the special switch off feature.

Referring to FIG. 1, the special switch off feature is preferably a combination of key presses of the mobile phone. For example, the special switch off feature can be a combination of numeric key presses and the power key. The combination of numeric key presses is user configurable. Accordingly, the user will be given an option to configure the keys for "Special switch off" in the security menu of the phone. For example, the user can configure the special switch off feature as the combination of 1234+power key. Thereafter, in order to switch off the mobile phone completely, the configured key sequence should be entered. Alternatively, this can be a single key entry instead of a key sequence.

Once the "Special Switch Off" feature is configured, the mobile phone behaves as described below, when a normal power off is encountered.

When the mobile phone is switched off using normal switch off key, the mobile phone enters an inactive mode, wherein the screen, incoming/outgoing calls, ring, etc., of the phone are disabled, except for the ability to accept and send messages. In other words, according to an embodiment of the present invention, when the mobile phone is stolen (or lost) and encounters a normal power off, the owner can still send messages to the stolen (or lost) mobile phone and appropriate action can be taken. Although it appears to the unauthorized user that the mobile phone is in a completely switched off state, internally the functionality of SMS reception, sending, and destructively reading out data is still enabled.

As illustrated in FIG. 1, if the special switch off feature is not enabled in step S110, and the user wants to enable the special switch off feature in step S112, then a Personal Identification Number (PIN), which is previously configured in the security settings of the mobile phone, is entered in step S116. If the correct PIN is entered in step S118, the user enters the desired key sequence in step S120.

If the special switch off feature is enabled in step S110, the user can also modify a previously entered key sequence as desired, using the above described steps.

In accordance with another embodiment of the present invention, destructively reading out data is supported by the provision of a mechanical latch.

Figure 2:
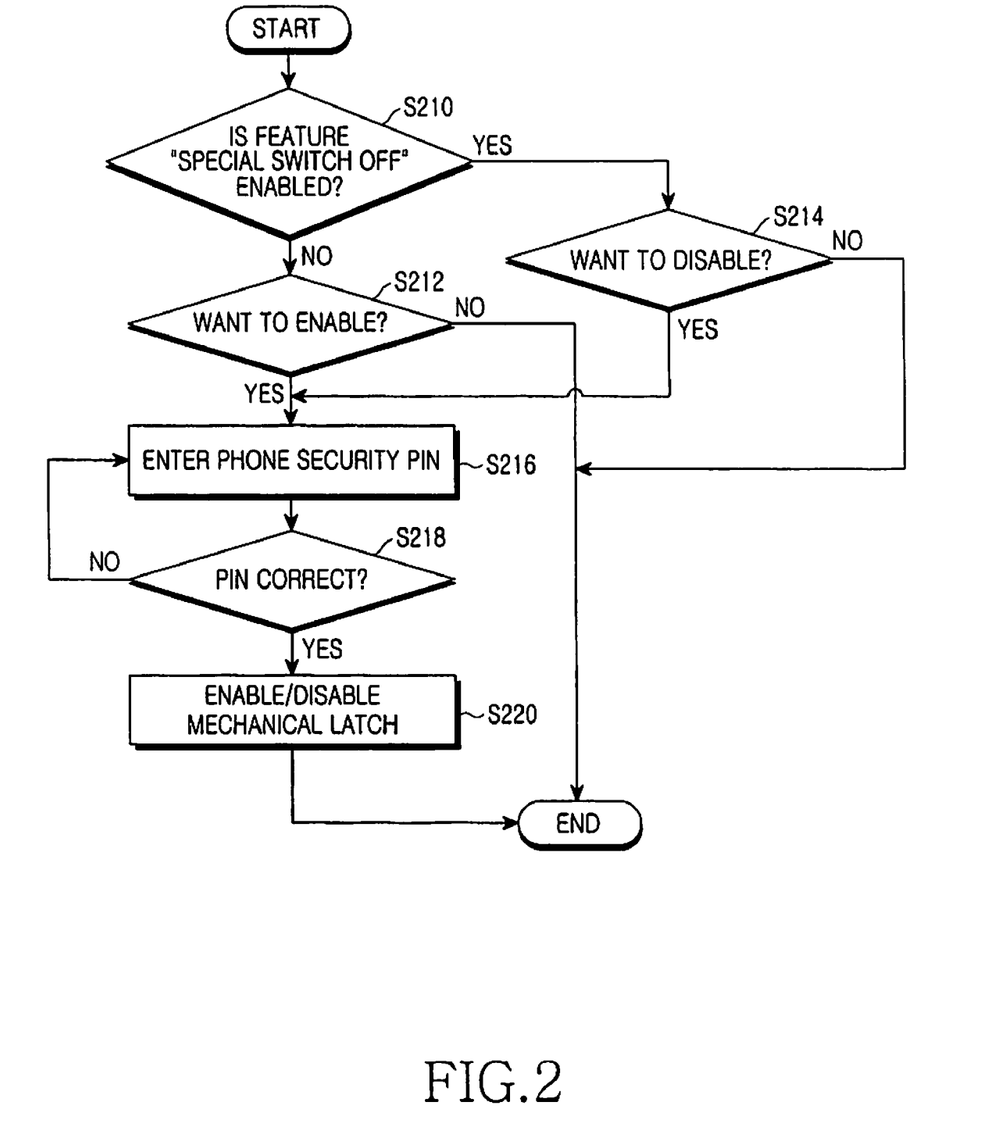
FIG. 2 is a flowchart illustrating a method for enabling/disabling a mechanical latch.

FIG. 2 illustrates a method for enabling/disabling the mechanical latch when the special switch off feature is configured. Basically, a latch is activated the prevents the person who has stolen or found the mobile phone from removing the SIM card, thereby enabling the owner of the mobile phone to continuously contact the mobile phone.

In accordance with an embodiment of the present invention, the mechanical latch is enabled by entering the security PIN that has been configured in the security settings of the mobile phone. Once enabled, in order to remove the SIM card, the security PIN should be reentered to disable the mechanical latch, and then the SIM card can be removed.

Referring to FIG. 2, in step S218, if the input security PIN is correct, then the mechanical latch may be either enabled or disabled by the user. However, if the input security PIN is different from to the pre-configured PIN of the mobile phone, the mechanical latch is maintained in its current state. Steps S210 to S218 are the same as steps S110 to S118. Therefore, a description of these steps will not be repeated.

Additionally, in accordance with another embodiment of the present invention, if the person who has stolen or found the mobile phone attempts to break the mechanical latch without disabling the above said feature, the mobile phone will permanently go into a switched off mode, thereby preventing any chance of misuse of the confidential data stored in the mobile phone.

In accordance with another embodiment of the present invention, when the mobile phone is stolen or lost, the data in the mobile phone can be secured by enabling a destructive read out feature and retrieving the data to the service provider. In accordance with this embodiment, the service provider provides an inbox for the user wherein the retrieved data can be stored. In order to enable the retrieval of data into the inbox provided by the service provider, the user informs the service provider to enable the service by sending a message in specific format.

For example, the format can be <CMD, Destructive read out, Service Provider Name>.

The service provider then provides the user a specific password and an inbox IDentification (ID). This password can be stored in the destructive readout settings menu of the mobile phone and may be in an encrypted format.

Figure 3:
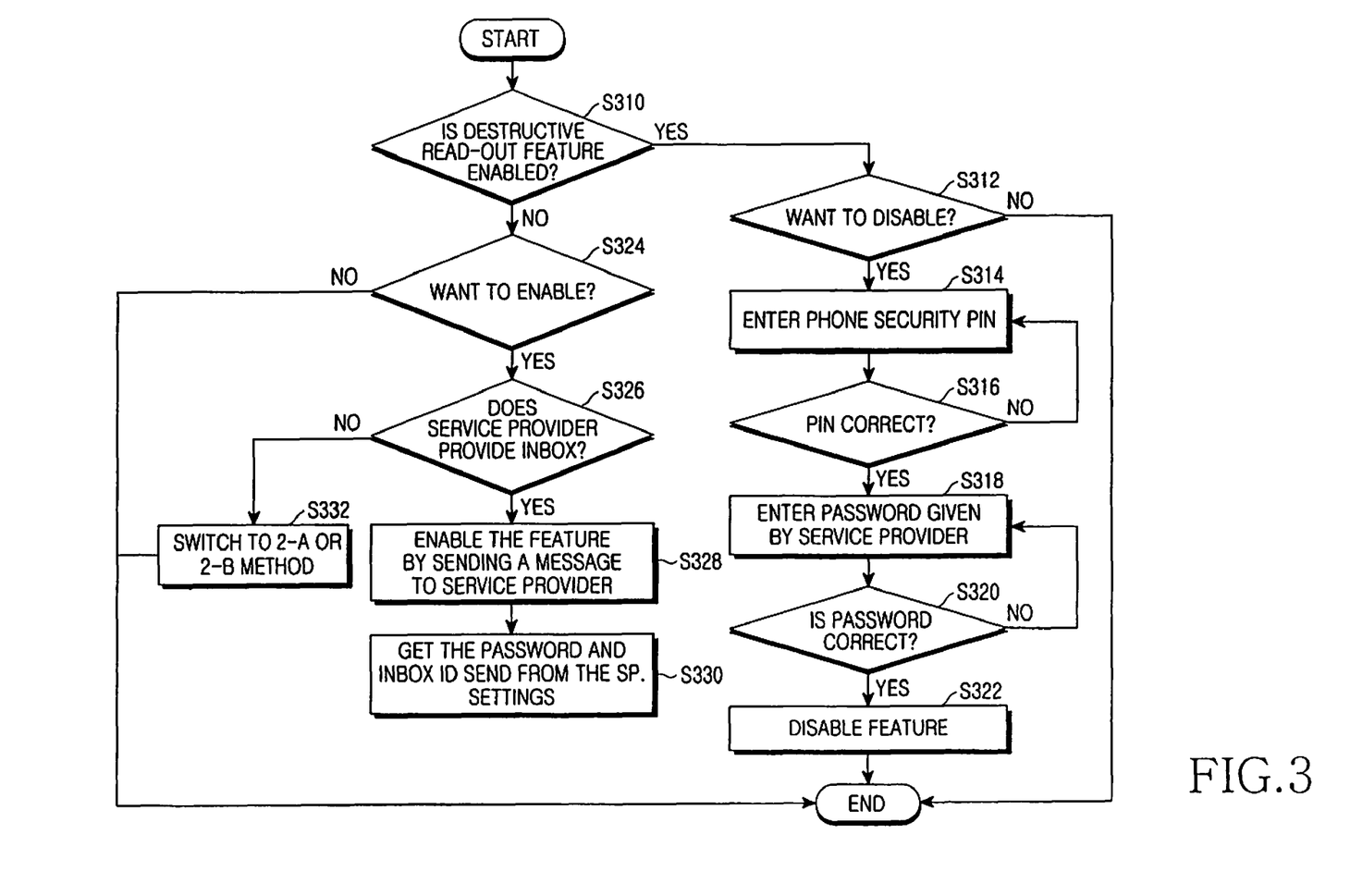
FIG. 3 is a flowchart illustrating a method for a destructive read out feature while retrieving data to the service provider.

FIG. 3 is a flowchart illustrating a method for a destructive read out feature while retrieving data to the service provider. In FIG. 3, the following actions will take place, when the mobile phone is stolen or lost, while retrieving the data from the mobile phone to the inbox.

As described above, the user sends a request message to the service provider to retrieve the data from the mobile phone. The service provider in turn sends an SMS in the specific format to the mobile phone. For example, the specific format may be <CMD, Destructive read out, password, inbox id>.

Here, the inbox id is the id of the inbox allotted to a particular user by the service provider. The mobile phone, on receipt of the SMS, will validate the password and then start sending all its data stored in it to the inbox provided to the user. This data sending is termed as destructive readout as the data in the mobile phone will be erased after being provided to the user.

In accordance with an embodiment of the present invention, the user can also choose to disable the destructive read out feature by entering the PIN, followed by the password given by the service provider, if desired.

In accordance with another embodiment of the present invention, when the mobile phone is stolen or lost, the data in the mobile phone can be secured by enabling the destructive read out feature and retrieving the data to a pre-configured number, without the intervention of the service provider. This can be achieved by configuring an initiator mobile number (xxxxxxxxxxxxxx), which is the mobile phone that will be used to send the Message to the stolen/lost mobile, and a receiver mobile number (yyyyyyyyyyyyyy) to which the retrieved data will be sent.

A password is stored in the destructive readout settings menu of the mobile phone.

Referring to FIG. 3, if a destructive readout feature is enabled in step S310, and the user wishes to disable this feature in step S312, the user enters a security in step S314. If the entered security PIN is identical to the pre-configured PIN of the mobile phone, i.e., correct, the user enters a password allocated by the service provider in step S318. If the entered password is identical to the pre-configured password of the mobile phone, i.e., correct, in step S320, the mobile phone disables the destructive readout feature in step S322.

However, if a destructive readout feature is not enabled in step S310, and the user wishes to disable this feature in step S324, if the service provided provides an inbox in step S326, the user requests the destructive readout feature to the service provider by sending a message in step S328. Upon receipt of a response for the request from the service provider, the mobile phone receives a password and an inbox ID from the service provider and stores the password in mobile phone settings in step S330.

However, if the service provider does not provide an inbox in step S326, the mobile phone sends data to another mobile phone in step S322. Step S322 will be described in more detail with reference to FIG. 7.

Figure 4:
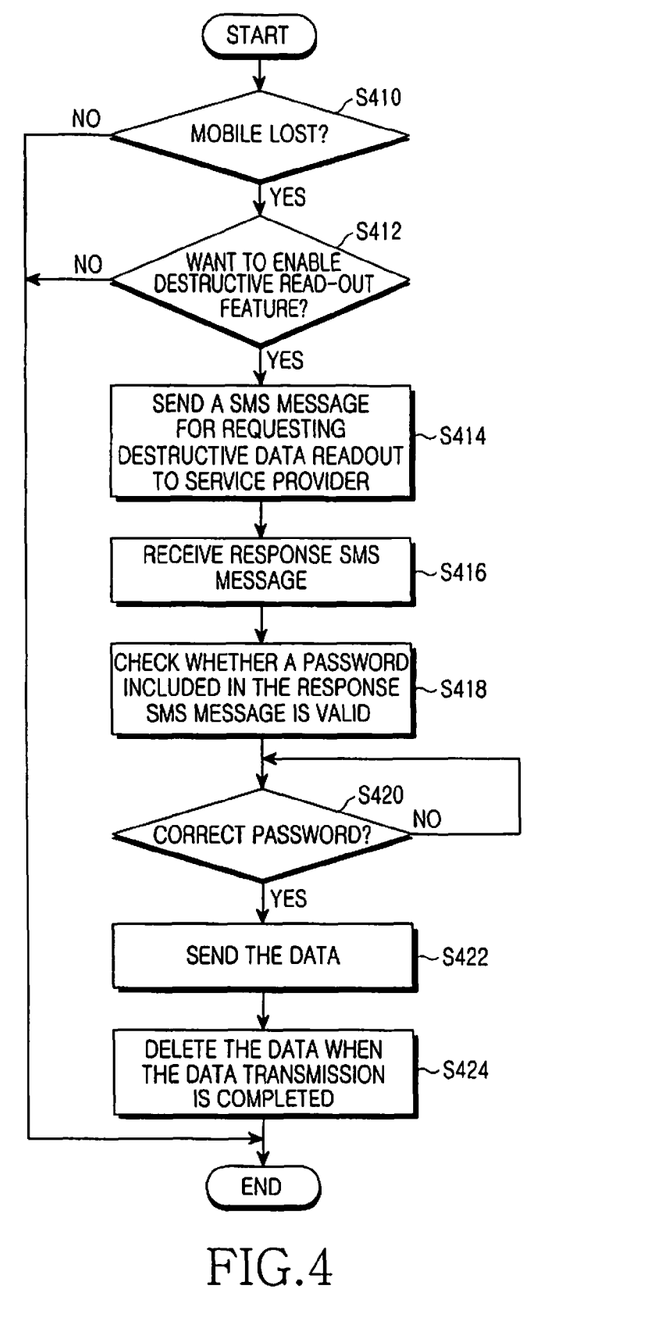
FIG. 4 is a flowchart illustrating a method for a destructive read out feature while retrieving data to a preconfigured mobile number, without the intervention of the service provider.

FIG. 4 is a flowchart illustrating a method for a destructive read out feature while retrieving data to a preconfigured mobile number, without the intervention of the service provider. Referring to FIG. 4, when the mobile is stolen or lost, in order to retrieve the stored data to a pre-configured number with the help of the service provider, the user informs the service provider and requests to retrieve the data. The service provider then sends an SMS in, for example, the following the stolen mobile, <CMD, Destructive read out, password, xxxxxxxxxxxxxxx>.

Here, xxxxxxxxxxxxxxx is the mobile phone number to which the data is to be sent. The mobile phone receiving the SMS in this particular format will validate the password and then start sending all its data in it to the mobile phone number provided in the SMS sent by the service provider. This data sending is termed as destructive readout as the data in the mobile phone will be erased after being sent. The user will have the option to disable the destructive read out feature by entering the PIN followed by the password given by the service provider, if desired.

Referring to FIG. 4, when the mobile phone is lost in step S410, and the user wants to read stored data from the mobile phone, in step S412, an SMS message requesting data readout is sent to the service provider in step S414. In steps S416 and S418, a response SMS message for the data readout request is received from the service provider and it is determined whether a password included in the response SMS message is valid by comparing it with the pre-configured password of the mobile phone. If the password included in the response SMS message is valid, i.e., correct, in step S420, the stored data is sent to a phone number of a receiving mobile phone set in the response SMS message in step S422. When the transmission is completed, the stored data is deleted from the mobile phone in step S424.

Figure 5:
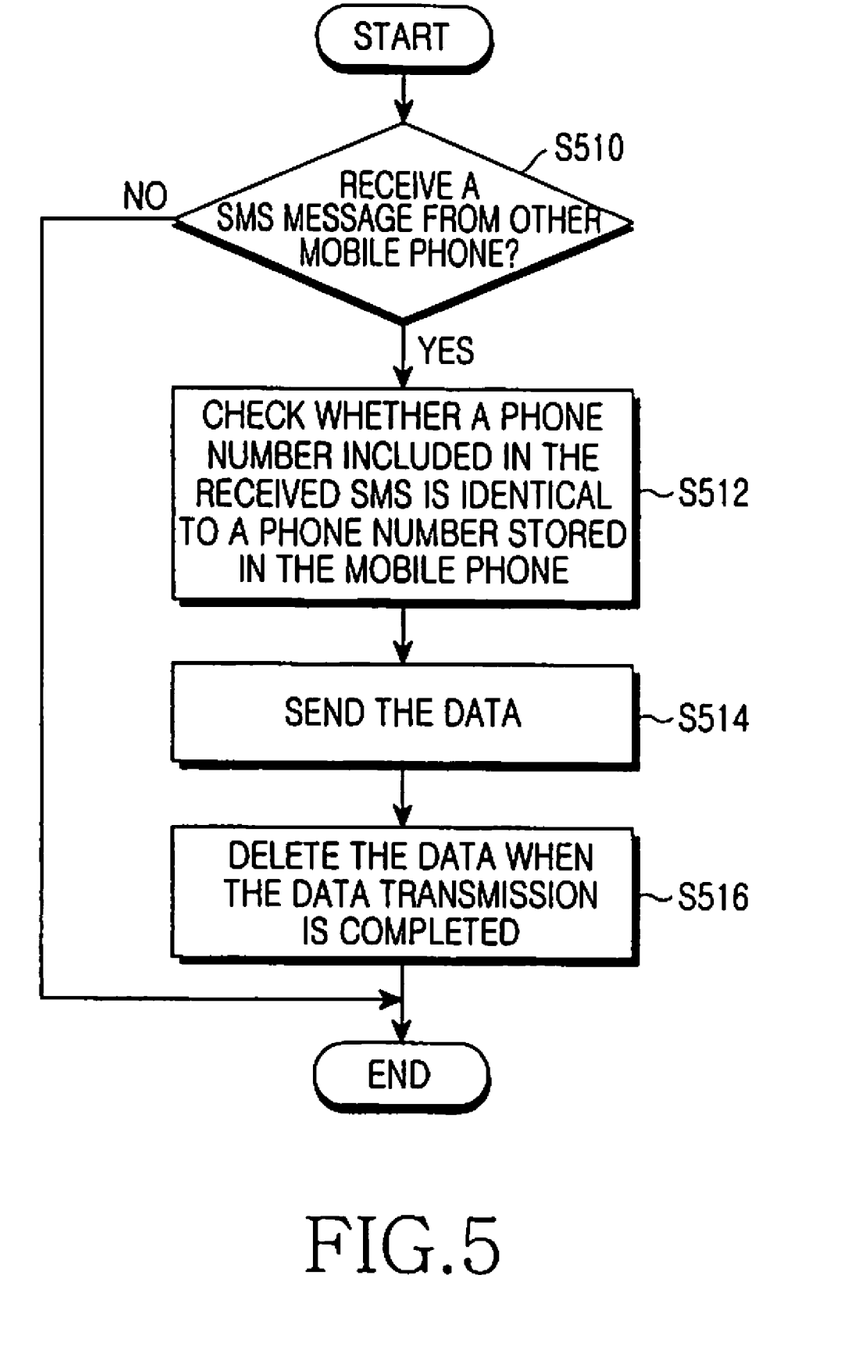
FIG. 5 is a flowchart illustrating a method for a destructive read out feature while retrieving data to a preconfigured mobile number with the assistance of the service provider.

FIG. 5 is a flowchart illustrating a method for a destructive read out feature while retrieving data to a preconfigured mobile number with the assistance of the service provider. Referring to FIG. 5, in the event of a mobile phone theft, in order to retrieve the stored private data from the lost mobile phone to a pre-configured number without seeking the intervention of the service provider, the user sends an SMS from the mobile number xxxxxxxxxxxxxxx as <CMD, Destructive read out, password, yyyyyyyyyyyyyy>, for example.

Here, yyyyyyyyyyyyyy is the mobile phone number to which the retrieved data has to be sent. The mobile phone, upon receiving the SMS in this particular format, will first check the sender number, which is xxxxxxxxxxxxxxx, with the initiator mobile number stored in the mobile, and if it matches, then it will proceed to validate the password and receiver mobile number and then start sending all its data to the mobile phone number, i.e., yyyyyyyyyyyyyy, provided in the SMS. The number yyyyyyyyyyyyyy and xxxxxxxxxxxxxxx can be the same. This data sending is termed as destructive readout as the data in the mobile phone will be erased after being transmitted. The user can choose to disable the destructive read out feature by entering the PIN followed by the password given by the service provider if desired.

In accordance with another embodiment of the present invention, when the mobile phone is stolen or lost, the data in the mobile can be secured by enabling the destructive read out feature and retrieving the data to a pre-configured number with the help of the service provider. In this case, the user informs the service provider to enable the service by sending a message in a specific format. For example, this format can be <CMD, Destructive read out, xxxxxxxxxxxxxxx>.

Here, xxxxxxxxxxxxxxx is the mobile phone number to which the data should be sent. The service provider will then send a SMS containing the specific password to the user. This password will be stored in the destructive readout settings menu of the mobile phone.

Referring to FIG. 5, when the mobile phone is lost, the user wants to read stored data from the mobile phone, and an SMS message is received from another mobile phone, in step S510, it is determined whether a phone number included in the received SMS message is identical to a phone number stored in the mobile phone in step S512. In this case, transmission of an SMS message from the lost mobile phone to the phone number included in the received SMS message should precede for the lost mobile phone to send data. If the phone numbers are identical in step S510, the mobile phone sends the data to the phone number included in the received SMS message and when the data transmission is completed, deletes the data in steps S514 and S516.

Figure 6:
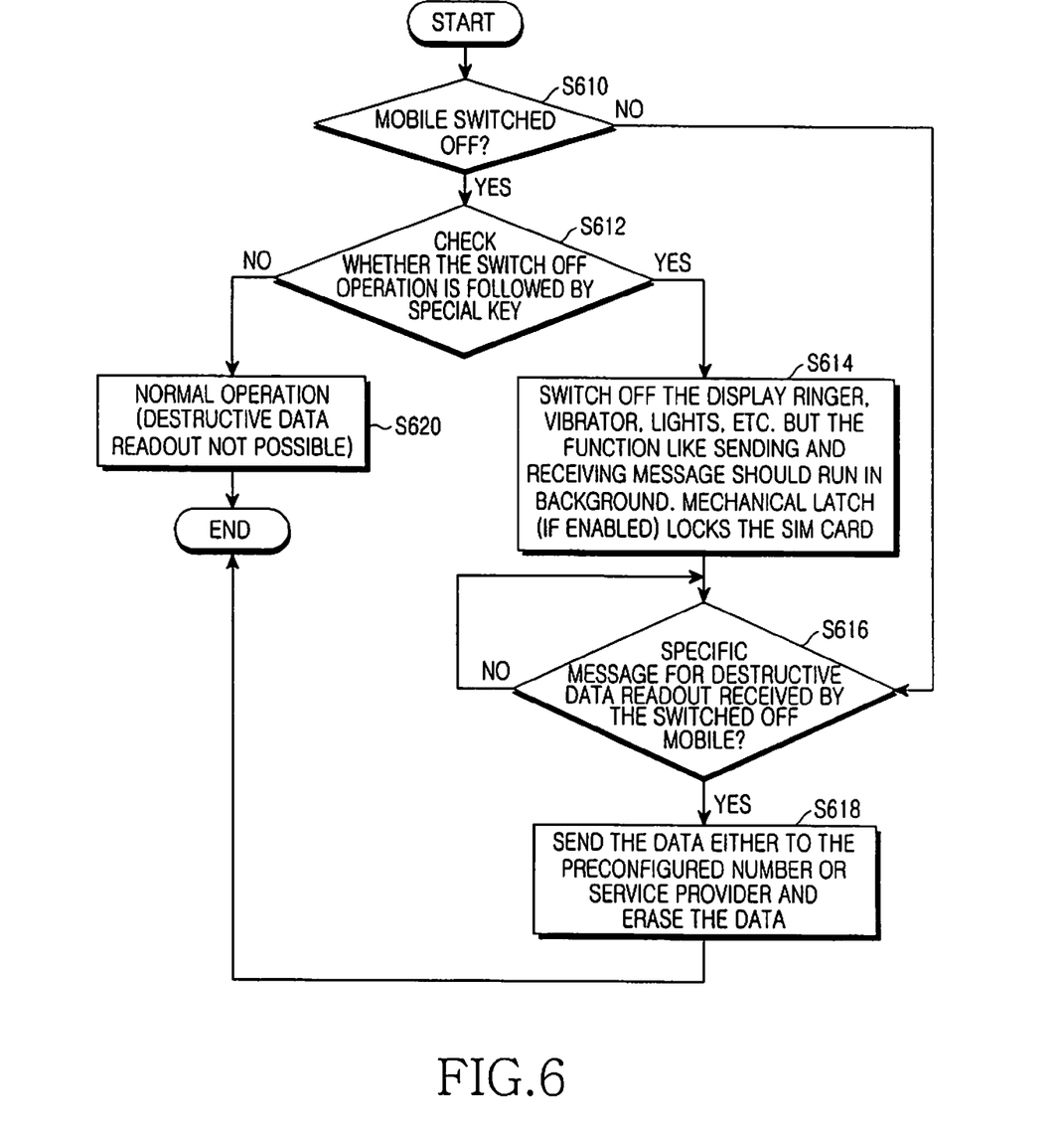
FIG. 6 is a flowchart illustrating a method of operation by a mobile phone, when the mobile phone is stolen/lost.

FIG. 6 is a flowchart illustrating a method of operation by a mobile phone, when the mobile phone is stolen or lost. If the mobile phone is switched off in step S610, it checks if the switch off operation is followed by a specific key in step S612. If the switch off operation is followed by specific key then the special switch off operation is enabled, i.e., all the features with mobile will be disabled except the messaging service and the destructive read out feature, in step S614. Because the mobile can send and receive messages using this messaging service, based upon the Specific Message for destructive data read out received by the switched off mobile, the data is either sent to the pre-configured number or to the service provider. Once the data from the switched off mobile is retrieved all the data in the mobile will be erased in steps S614 to S618.

If the switch off operation is not followed by specific key in step S612, then normal operation is maintained in step S620.

Figure 7:
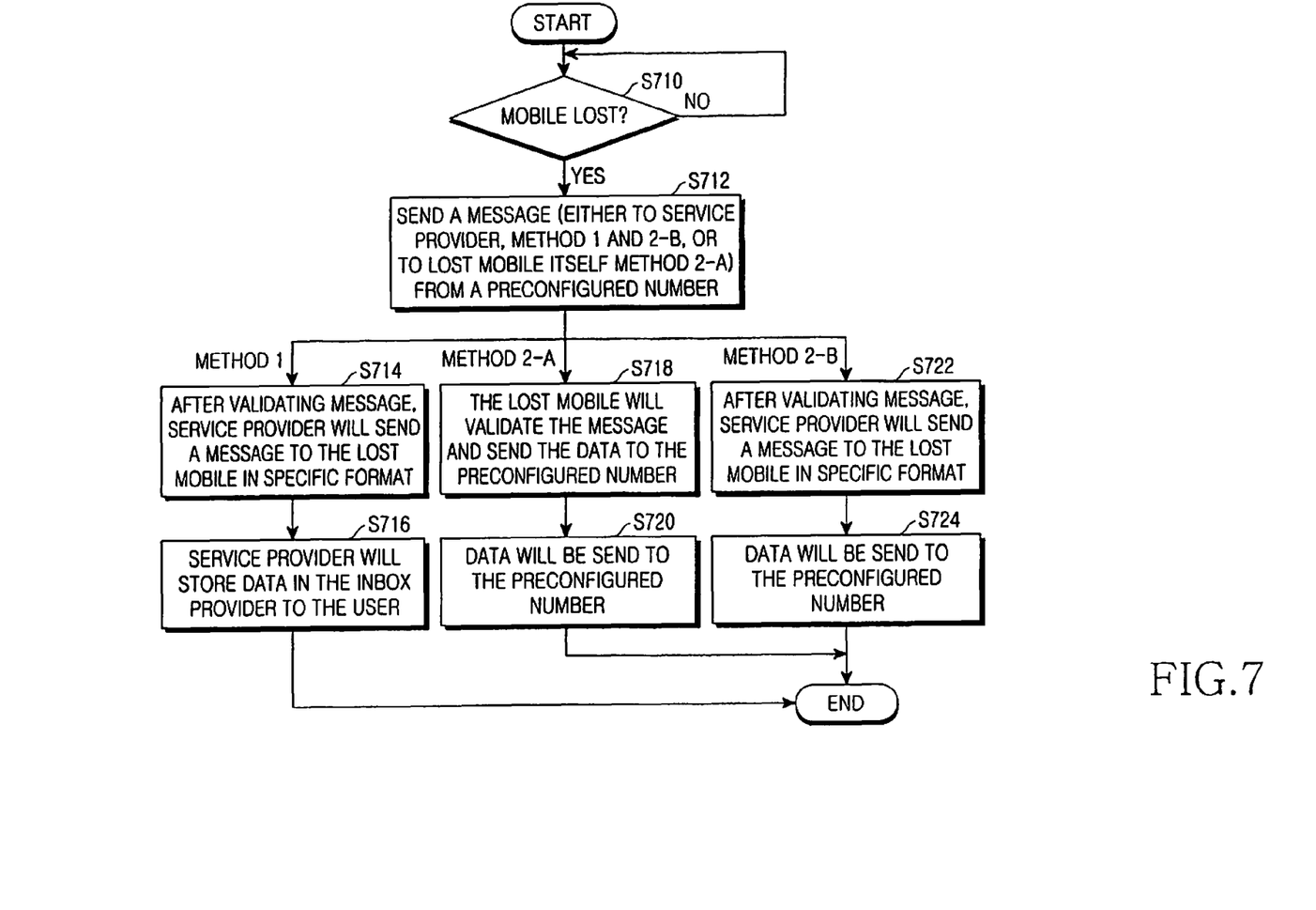
FIG. 7 is a flowchart illustrating a method for destructive read out of data when a mobile phone is stolen or lost.

FIG. 7 is a flowchart illustrating a method for destructive read out of data when a mobile phone is stolen or lost. That is, when the mobile is stolen or lost, in step S710, and if the feature of destructive read out of data has been enabled in the mobile, then the data in the lost mobile phone can be secured and can be retrieved depending upon the message for destructive data read out received by the switched off mobile.

As described above, the data from the mobile phone can be retrieved by the service provider by allotting an inbox for the specific user in the service provider system. The data from the mobile phone will be sent to the inbox upon request by the user and the data in the mobile phone will be erased once the data is retrieved. More specifically, in step S712, if an owner of the lost mobile phone wants to store the data in an inbox, the service provider validates the message on receipt of receiving the message for requesting for destructive data, and transmits a message in specific format to the lost mobile phone, in step S714. Thereafter, the lost mobile phone transmits the data to the inbox, the service provider stores the data into the inbox provided to the user of mobile phone, in step S716.

Alternatively, the data from the mobile phone can be retrieved by sending the data to a pre-configured number. For this, the mobile phone has to be configured with the initiator mobile number, which is used to send the message to the mobile phone in case it is stolen or lost, receiver mobile number to which the data from the stolen or lost mobile phone is sent, and password in the destructive readout settings menu of the mobile phone. This is done without any intervention from the service provider. More specifically, the lost mobile phone receives the message for destructing data, then the lost mobile phone validates the received message, and transmits the data to the pre-configured number included in the received message, in step S718. Thereafter, the transmitted data is stored in another mobile phone of the pre-configured number, in step S720.

Alternatively, the data from the mobile phone can also be retrieved by sending the data to a pre-configured number with the aid of the service provider. Here, the user sends a SMS to the service provider in a pre-defined format, which contains the mobile phone number to which the data has to be sent. In the event of mobile phone getting stolen or lost, the user requests the service provider to retrieve data from the mobile. The service provider in turn sends a SMS to the mobile phone, requesting it to send the data to a pre-configured number. More specifically, in step S712, if an owner of the lost mobile phone wants to store the data in inbox, the service provider validates the message after receiving the message for requesting for destructive data, and transmits a message in specific format to the lost mobile phone, in step S722. Thereafter, the lost mobile phone transmits the data to the inbox, the service provider stores the data into the inbox provided to the user of mobile phone, in step S724.

As described above, once the data is retrieved, the data in the mobile phone that has been either stolen or lost will be erased.

While the present invention has been fully described in connection with the preferred embodiments thereof, it is to be noted that various changes and modifications are possible and are apparent to those skilled in the art. Such changes and modifications are to be understood as included within the scope of the present invention as defined by the appended claims unless they depart therefrom.

What is claimed is:

1. A method of retrieving data from a mobile phone, the method comprising:
   receiving a message for retrieving the data from another mobile phone or service provider;
   retrieving the data;
   deleting the data stored in the mobile phone, if retrieving of the data is completed;
   enabling, upon receiving input of a security Personal Identification Number (PIN) configured in the security settings of the mobile phone, a mechanical latch in order to prevent an unauthorized user from removing a Subscriber Identity Module (SIM) card from the mobile phone; and
   permanently powering down the mobile phone if a tampering with the mechanical latch is detected.

2. The method of claim 1, further comprising:
   enabling a special switch off feature that disables all mobile phone functions, except for an ability to perform the receiving, the retrieving, and the deleting.

3. The method of claim 1, further comprising validating the received message by comparing an identifier included in the message to an identifier previously stored in the mobile phone.

4. The method of claim 1, wherein the mechanical latch is enabled upon receiving input of the security PIN configured in the security settings of the mobile phone, in order to prevent the unauthorized user from removing the SIM card from the mobile phone.

5. The method of claim 1, wherein the retrieved data transmits to the another mobile phone or an inbox provided by the service provider.

6. The method of claim 1, wherein the message includes information of the another mobile phone or information of the service provider.

7. A method of protecting and retrieving data in a mobile phone, when the mobile phone is stolen or lost, the method comprising:
   enabling a special switch off feature of the mobile phone;
   receiving a message in the mobile phone;
   retrieving the data from the mobile phone, in response to the message;
   deleting the retrieved data from the mobile phone,
   wherein the special switch off feature powers off the mobile phone, except for an ability to perform the receiving, the retrieving, and the deleting;
   enabling, upon receiving input of a security Personal Identification Number (PIN) configured in the security settings of the mobile phone, a mechanical latch in order to prevent an unauthorized user from removing a Subscriber Identity Module (SIM) card from the mobile phone; and
   permanently powering down the mobile phone if a tampering with the mechanical latch is detected.

8. The method of claim 7, wherein retrieving the data from the mobile phone, in response to the message, comprises:
   reading the data from a memory of the mobile phone; and
   transmitting the read data to a secure destination.

9. The method of claim 8, wherein the secure destination is an inbox provided by a service provider.

10. The method of claim 8, wherein the secure destination is another mobile phone.

11. The method of claim 8, wherein the secured location is previously stored in the mobile phone.

12. The method of claim 8, wherein the secured location is included in the message.

13. The method of claim 7, wherein the message is sent from another phone.

14. The method of claim 7, further comprising validating the received message.

15. The method of claim 14, further comprising validating the received message by comparing an identifier included in the message to an identifier previously stored in the mobile phone.

16. The method of claim 7, wherein the message is sent from a service provider.

17. The method of claim 16, wherein the service provided receives a request from an owner of the mobile phone prior sending the message.

18. The method of claim 17, wherein the service provider authenticates an identity of the owner prior sending the message.

19. The method of claim 7, wherein the mechanical latch is enabled upon receiving input of the security PIN configured in the security settings of the mobile phone, in order to prevent the unauthorized user from removing the SIM card from the mobile phone.

* * * * *